(12) United States Patent
Mudulodu et al.

(10) Patent No.: US 11,916,679 B2
(45) Date of Patent: Feb. 27, 2024

(54) APPARATUS AND METHOD TO REDUCE SPECTRAL PEAKS IN BLUETOOTH COMMUNICATIONS

(71) Applicant: Silicon Laboratories Inc., Austin, TX (US)

(72) Inventors: Sriram Mudulodu, Hyderabad (IN); Divyaxi Rudani, Hyderabad (IN); Manoj Medam, Hyderabad (IN); Partha Sarathy Murali, Sunnyvale, CA (US); Ajay Mantha, Hyderabad (IN); Suchin Gupta, Hyderabad (IN)

(73) Assignee: Silicon Laboratories Inc., Austin, TX (US)

( * ) Notice: Subject to any disclaimer, the term of this patent is extended or adjusted under 35 U.S.C. 154(b) by 8 days.

(21) Appl. No.: 17/006,532

(22) Filed: Aug. 28, 2020

(65) Prior Publication Data

US 2021/0075557 A1    Mar. 11, 2021

Related U.S. Application Data

(60) Provisional application No. 62/899,076, filed on Sep. 11, 2019.

(51) Int. Cl.
*H04L 1/1812* (2023.01)
*H04L 25/03* (2006.01)
*H04W 4/80* (2018.01)

(52) U.S. Cl.
CPC .......... *H04L 1/1819* (2013.01); *H04L 1/1816* (2013.01); *H04L 25/03866* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 10,073,169 B1 * | 9/2018 | Ahirwar | ................. G01S 11/08 |
| 2004/0010744 A1 * | 1/2004 | Chen | ..................... H04L 1/0009 |
| | | | 714/755 |
| 2005/0181729 A1 * | 8/2005 | Ibrahim | ................ H04L 27/142 |
| | | | 455/67.11 |

(Continued)

FOREIGN PATENT DOCUMENTS

CA    2387814 A1 *   5/2001

OTHER PUBLICATIONS

Bluetooth Core Specification, v5.1, Jan. 21, 2019, 2985 Pages. (Year: 2019).*

*Primary Examiner* — Ajit Patel
*Assistant Examiner* — Liem H. Nguyen
(74) *Attorney, Agent, or Firm* — File-EE-Patents.com; Jay A. Chesavage

(57) ABSTRACT

A bitstream modifier is operative on a packet which uses repetition coding. The bitstream modifier increases randomness of the data in a deterministic manner such that spectral spurs from repetition coding are greatly reduced, thereby providing greater available transmit power. In another example of the invention, baseband samples of a header and/or payload for a Bluetooth packet are modified by a canonical sequence with a low slew rate for data such that the variations in frequency may be tracked by a receiver and the transmitted spectral spurs reduced.

19 Claims, 4 Drawing Sheets

(56) References Cited

U.S. PATENT DOCUMENTS

| | | | |
|---|---|---|---|
| 2005/0270172 A1* | 12/2005 | Bailey | E21B 47/12 340/854.3 |
| 2007/0121946 A1* | 5/2007 | Ito | H04L 1/0072 380/270 |
| 2009/0021320 A1* | 1/2009 | De Jong | H03F 3/217 332/109 |
| 2010/0023990 A1* | 1/2010 | Chen | H04L 27/2647 725/118 |
| 2010/0245136 A1* | 9/2010 | Azadet | H03M 7/3008 341/118 |
| 2012/0099628 A1* | 4/2012 | Kim | H04B 3/546 375/257 |
| 2012/0140836 A1* | 6/2012 | Helard | H04L 27/2618 375/260 |
| 2012/0324315 A1* | 12/2012 | Zhang | H04L 27/2602 714/776 |
| 2015/0145571 A1* | 5/2015 | Perrott | G04F 10/005 327/551 |
| 2015/0196258 A1* | 7/2015 | Strickland | H04W 4/70 370/328 |
| 2016/0182262 A1* | 6/2016 | Leistner | H04J 11/0063 370/328 |
| 2019/0331796 A1* | 10/2019 | Pillet | G01S 7/4913 |
| 2020/0067633 A1* | 2/2020 | Carsello | H04L 27/144 |

* cited by examiner

125kbps BLR frames, L=255 MI=0.5 (Prior Art)
n=4 repetition coding

125kbps BLR frames, L=255 MI=0.5
16 bit coding block scramble

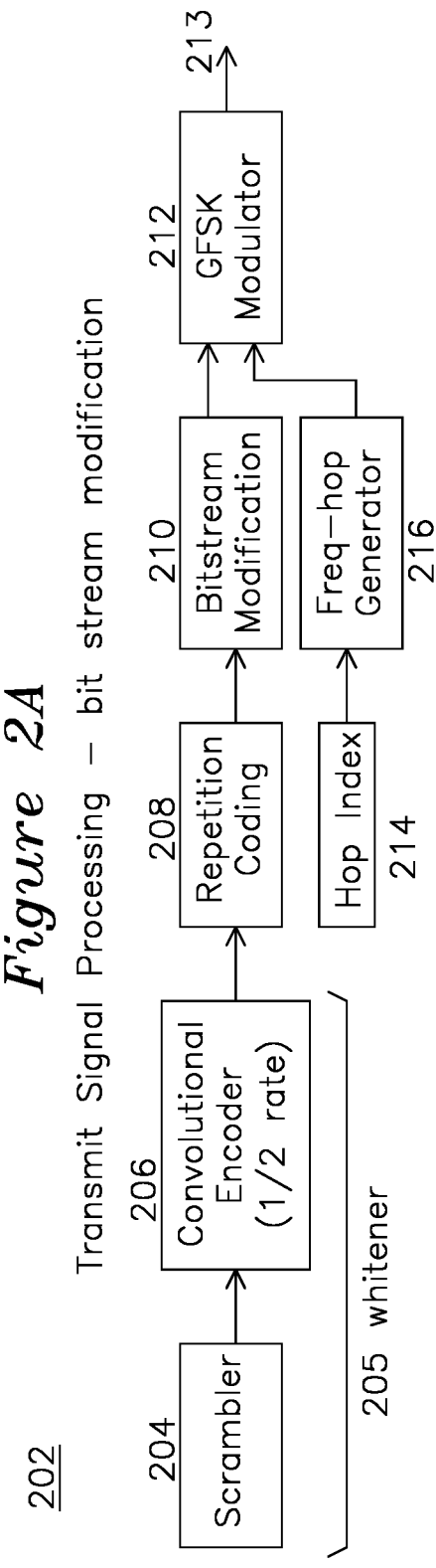
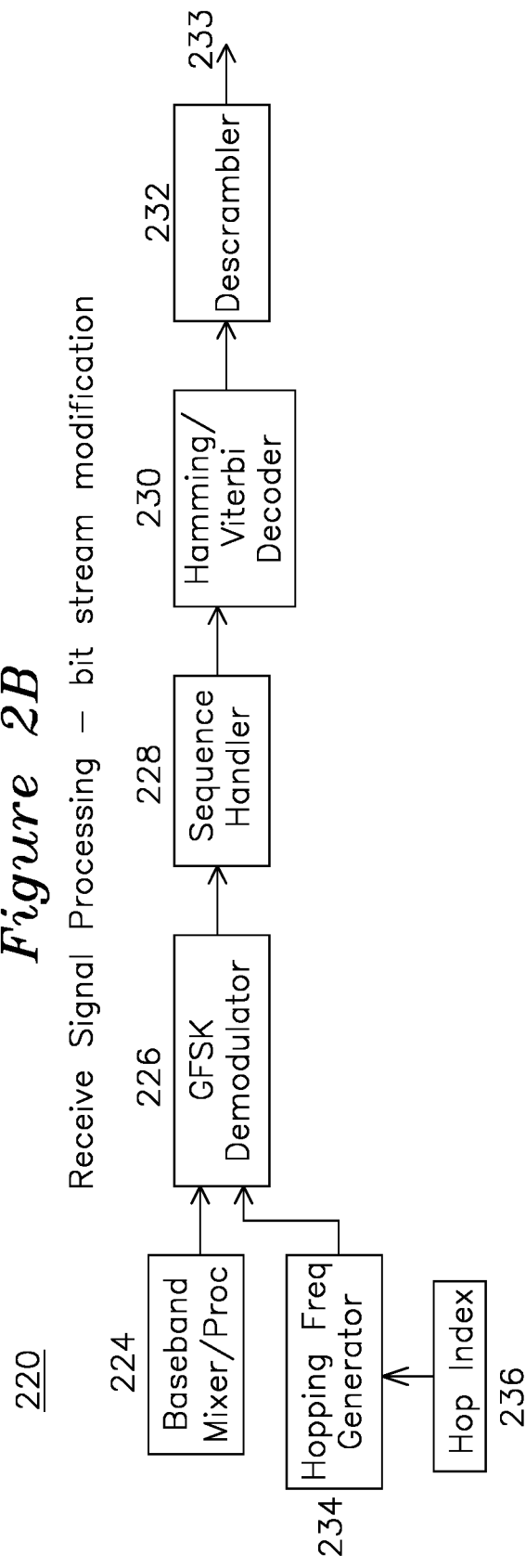

BLE Link Layer Packet Format

Example w(.) and w(mod(.)) functions

APPARATUS AND METHOD TO REDUCE SPECTRAL PEAKS IN BLUETOOTH COMMUNICATIONS

The present application claims priority to U.S. Provisional Patent Application Ser. No. 62/899,076 filed Sep. 11, 2019.

The present invention relates to reduction of peak radiated radio frequency (RF) emissions. In particular, the invention relates to reduction of RF emissions from a Bluetooth® transmitter.

FIELD OF THE INVENTION

Background of the Invention

Wireless transmission of RF energy requires compliance to various regulatory standards. In the case of Bluetooth communications operating in the Industrial, Scientific and Medical (ISM) 2.4 GHz frequency band, the applicable standard is the transmit mask described in section 3.2 "Spurious Emissions" of the Bluetooth specification Core Version 5.1 Vol 6, Part A, available from www.Bluetooth.com, referred to hereafter as the "Bluetooth specification".

A problem arises in longer reach modulations of Bluetooth Low Energy (BLE), where repetition coding is used to extend the link range for low data rates such as 125 kbps and 500 kbps by expanding 1 or 0 into longer bit sequence codes. When low data rates such as 125 kbps rate is transmitted to extend the range of BLE, the modulation types are known as Bluetooth Long Range (BLR). In BLR, the transmit symbol causes narrowband frequency spectrum peaks known as spectral spurs, and these spectral spurs establish maximum transmit levels in satisfaction of the transmit mask. In order to satisfy the transmit mask requirement in BLR, the transmit power level is reduced such that the spectral peaks caused by the repetition coding fall within the mask limits, which generally reduces the overall transmit energy available for communications, resulting in a reduced link power budget.

It is desired to provide a mechanism for reduction of repetition coding spurs and increase the transmit power level for improved range when using BLR data rates such as 125 kbps.

OBJECTS OF THE INVENTION

A first object of the invention is a signal processor for modification of a repetition coding to reduce narrowband RF spectral energy.

A second object of the invention is a transmit modulation signal processor for modification of a carrier frequency to reduce narrowband RF spectral energy.

A third object of the invention is a method for reduction of narrowband RF spectral energy using a pseudo random sequence applied to repetition coding used in BLR transmission and reception signal processing.

SUMMARY OF THE INVENTION

Repetition coding relies on repeated codes used with a repeated pattern. In one example of Bluetooth transmission with S=8 coding associated with 125 kbps, a "1" is represented by the sequence [1100] and a "0" is represented by the sequence [0011]. For a long sequence of 0 data or 1 data, the repeating pattern of identical symbols causes an increase in stationary spectral energy.

In one example of the invention, the transmit signal processing for certain BLR repetition coding is modified by application of a pseudo random bit sequence (PRBS) known to both the transmitter and the receiver.

In another example of the invention, the transmit modulator has a carrier modifier applied to spread the spectral energy of the repetition coding block during transmit intervals of the repetition coding to reduce narrowband spectral energy.

BRIEF DESCRIPTION OF THE DRAWINGS

FIG. 2A shows a block diagram of transmit signal processing for bitstream modification of BLR.

FIG. 2B shows receive signal processing for signal processing for bitstream modification of BLR.

DETAILED DESCRIPTION OF THE INVENTION

In the present specification, "approximately" a nominal value is understood to include a range of half the nominal value to twice the nominal value, and "on the order of" a nominal value is a range $\frac{1}{10}$th of the nominal value to 10× the nominal value.

Figure 1A:
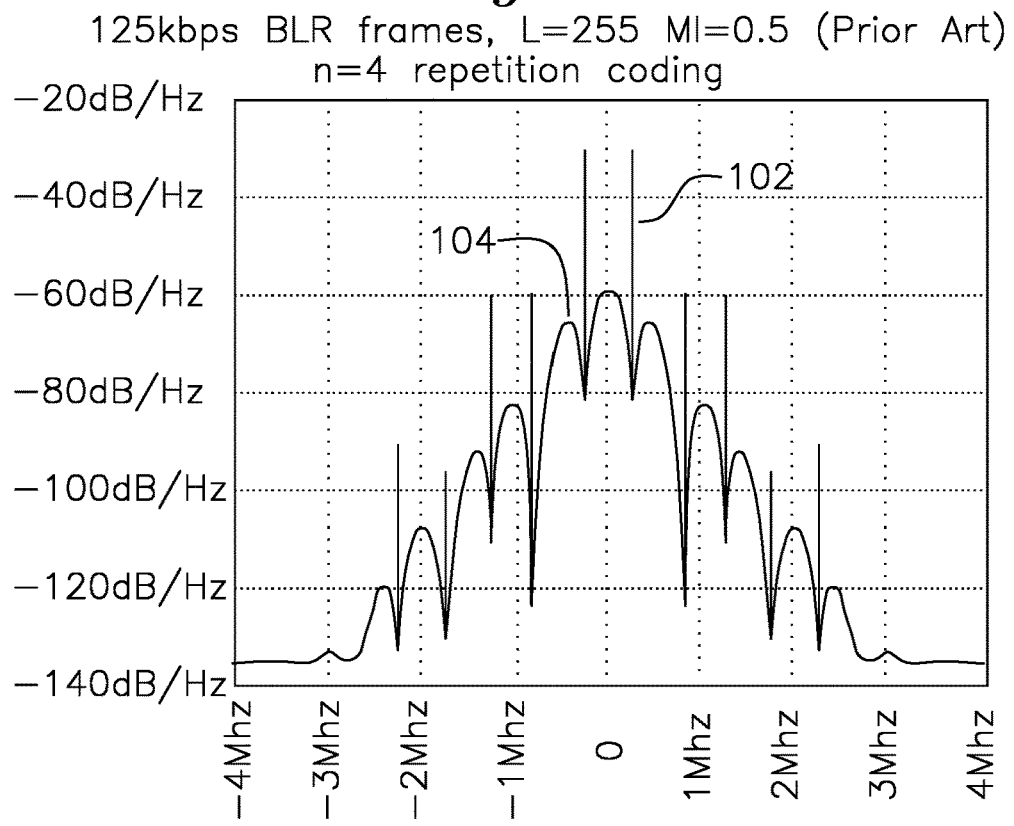
FIG. 1A shows a plot of the spectrum of an uncorrected 125 kbps BLR sequence.

FIG. 1A shows a baseband spectral plot for BLE frames with 125 kbps and a modulation index (MI) of 0.5 with S=8 repetition coding as specified in section 3.2.2 of the Bluetooth Core Specification version 5.1 available from www.bluetooth.com, referred hereafter as the "Bluetooth Specification" and incorporated in its entirety by reference. Sections of the Bluetooth Core Specification are provided for reference to certain aspects of the invention, and earlier or later versions of the Bluetooth specification are understood to provide equivalent functionality for aspects of the invention which are intended to be compliant with existing Bluetooth interoperability standards or proposed extensions of the Bluetooth specification. As described earlier, the peaks of narrowband spectral spurs 102 of the baseband frequency domain signal 104 establishes the maximum transmit power which can be emitted as radio frequency (RF) after mixing to the 2.4 GHz Bluetooth frequency band.

FIG. 2A shows a block diagram for transmit signal processing according to the present invention. The PDU (Protocol Data Unit) and CRC (Cyclic Redundancy Check) parts of the Bluetooth packet are "whitened" 205 by scrambler 204 and convolutional encoder 206 as described Vol 6, Part B, section 3.2 of the Bluetooth specification. In an example embodiment, the header comprising the preamble and access address (AA) parts are not modified, and whitening is applied to the payload data which follows, comprising the PDU and CRC. In another example of the invention, repetition coding substitutes a fixed pattern for each header bit when the data packet is configured for a data rate of 500 kbps. Payload data whitening comprises two steps, the first being an exclusive OR (XOR) operation with a pseudo random binary sequence (PRBS) $x^7+x^4+1$, as described in Vol. 6, Part B and section 3.2 of the Bluetooth Specification, and the second step being Forward Error Correction (FEC) according to the subsequent section 3.3.1 of the Bluetooth Specification, where a 1/2 rate code with constraint length K=4 is used according to:

$$G_0(x)=1+x+x^2+x^3 \text{ and}$$

$$G_1(x)=1+x^2+x^3$$

and the serial stream output by convolution encoder 206 alternates between $G_0$ and $G_1$ as also described in section 3.3.1 of the Bluetooth specification to provide whitened header and payload bits for subsequent processing.

Pattern mapping of the payload bits into a bit sequence of functional repetition coding 208 is described in preceding section 3.2.2 of the Bluetooth specification, for 125 kbps data rate of BTLR, repetition coding is performed on the Bluetooth frame payload, where the output of the whitening process 205 with scrambled 204 and convolution encoded 206 stream has a '0' encoded as [0011] and a '1' encoded as [1100] for 125 kbps data rates, as shown in table 3.1 of the Bluetooth specification. For 500 kbps data rate of BTLR, repetition coding is performed on the Bluetooth frame payload, where the output of the whitening process 205 and convolution encoded 206 stream has a '0' encoded as '0' and a '1' encoded as '1' for 500 kbps data rates, as shown in Part A Vol 1 table 3.1 of the Bluetooth specification V5.1.

The bitstream modification 210 provides a novel randomization of the 125 kbps and 500 kbps data rate repetition coding, thereby addressing the problem repeated data values causing spectral spurs for low speed data. In one aspect of the invention, the bitstream modification is a bit-by-bit exclusive or (XOR) operation with a PRBS sequence. The modification PRBS sequence can be any sequence desired which reduces the periodicity length of the repetition coding. In one example of the invention, the PRBS is generated by a linear feedback shift register (LFSR), including any of the examples shown below, each with a unique period of randomness, for which PRBS polynomials are shown for n=2 to 5, although larger values of n have well-known associated PRBS polynomials. It is believed that any PRBS with n greater than 3 will perform satisfactorily in reducing or eliminating the spectral spurs 102 of FIG. 1A in the output 213 of the GFSK modulator, with reference to the below list of well-known PRBS polynomials:

| bits(n) | PRBS polynomial | Period ($2^n - 1$) |
| --- | --- | --- |
| n = 2 | $x^2 + x + 1$ | 3 |
| n = 3 | $x^3 + x^2 + 1$ | 7 |
| n = 4 | $x^4 + x^3 + 1$ | 15 |
| n = 5 | $x^5 + x^3 + 1$ | 31 |

Figure 1B:
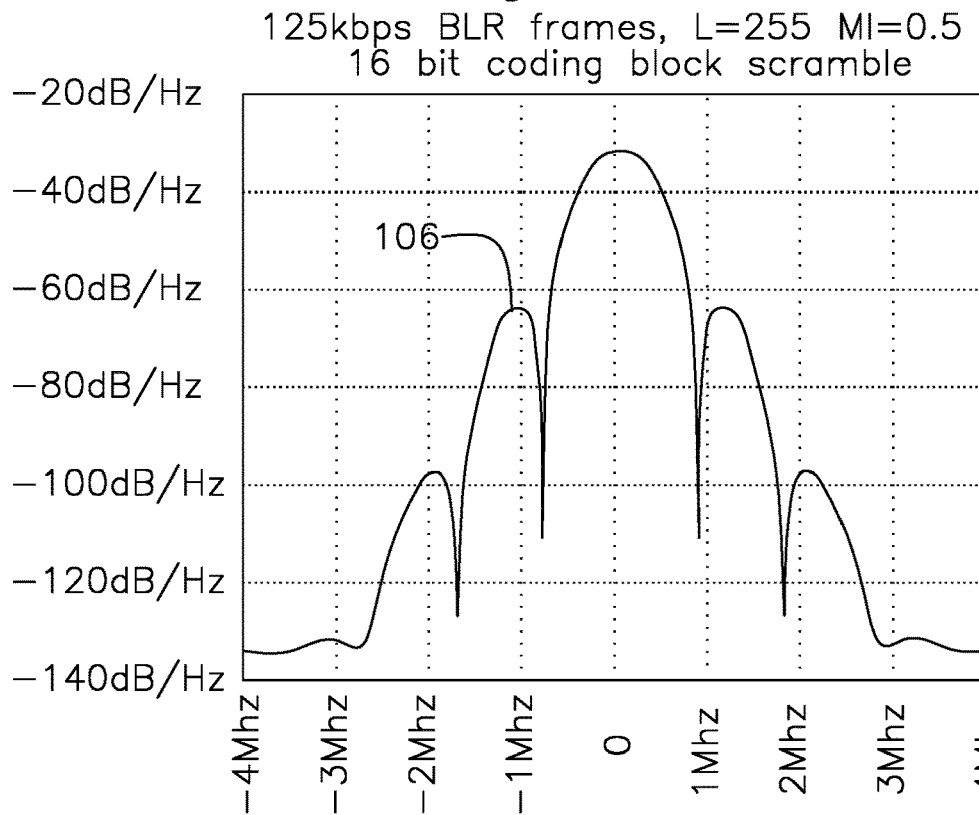
FIG. 1B shows a plot of the spectrum of a corrected 125 kbps BLR sequence according to an aspect of the invention.

The output of the bitstream modification 210 is applied to the GFSK modulator 212, which is responsive to frequency hop generator 216 according to the Bluetooth Hop Index 214 which specifies the hop sequence. The output 213 of the GFSK modulator 212 incorporating the bitstream modification 210 results in the temporal scrambling of the stationary repetition coding block data, resulting in the generation of the spectrum shown in FIG. 1B, which has broadened spectral peaks and the flattening of the spectral spurs 102 of FIG. 1A into the adjacent broadened spectral peaks.

FIG. 2B shows the block diagram for receive signal processing 220, where RF signals are demodulated to baseband and presented as digital samples by baseband mixer/processor 224. The baseband samples are provided to GFSK demodulator 226 which receives hopping frequency from hopping frequency generator 234 according to the Bluetooth frequency hopping sequence specified by hop index sequence generator 236. The output of the GFSK demodulator 226 is a digital sequence which corresponds to the format of the signal stream at the output of transmit bitstream modification 210, performing bitstream modified repetition coding. The sequence handler 228 performs the reverse bitstream modification performed by block bitstream modification 210, and the Hamming/Viterbi decoder 230 selects the most likely coding symbols, outputting 233 a descrambled 232 bitstream of data corresponding to the output of convolution encoder 206 of the transmit signal processing. In one example of the invention, the GFSK demodulator 226 output is a signed value (having positive and negative ranges rather than binary values 0 or 1), for which the XOR operation of transmitter bitstream modification 210 may be replaced by sample by sample multiplication for −1 for 0 and +1 for 1, since the result of the sequence handler 228 should also be multi-valued. The Hamming/Viterbi decoder 230 is de-scrambled, comprising a convolutional decoder and descrambler to generate the received bitstream which is organized into receive data.

Figure 3A:
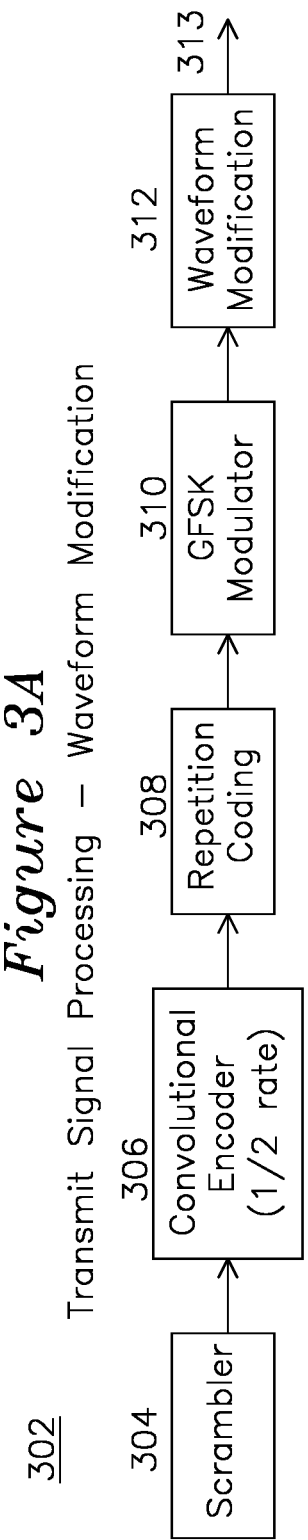
FIG. 3A shows transmit signal processing for waveform modification of BLR packets.
Figure 3B:
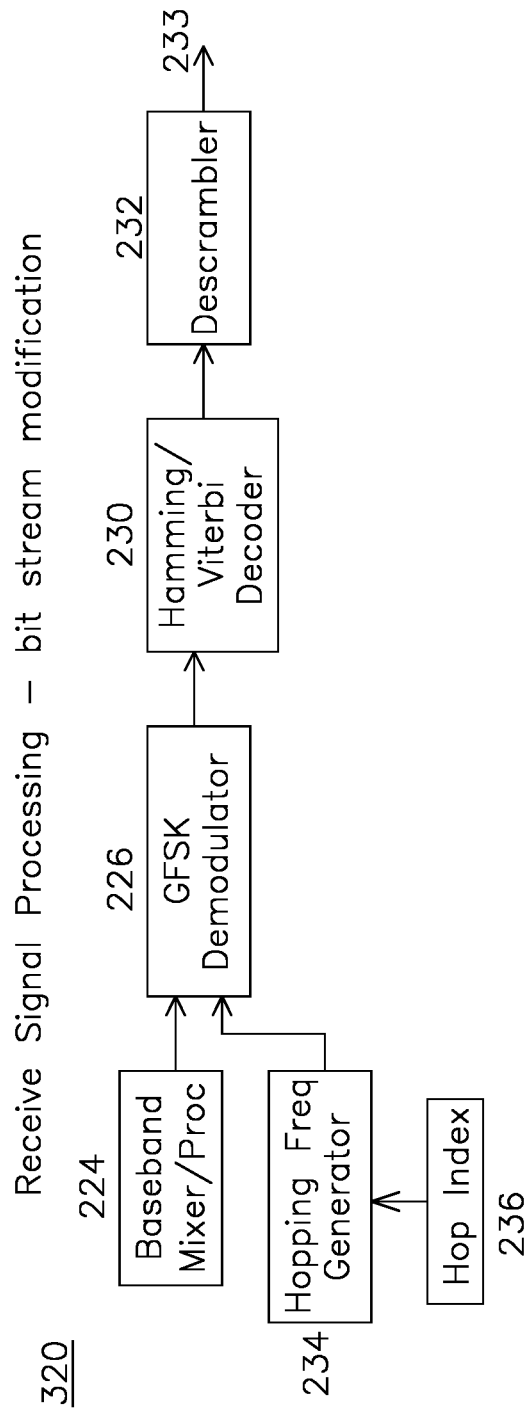
FIG. 3B shows receive signal processing for waveform modification of BLR packets.
Figure 4:
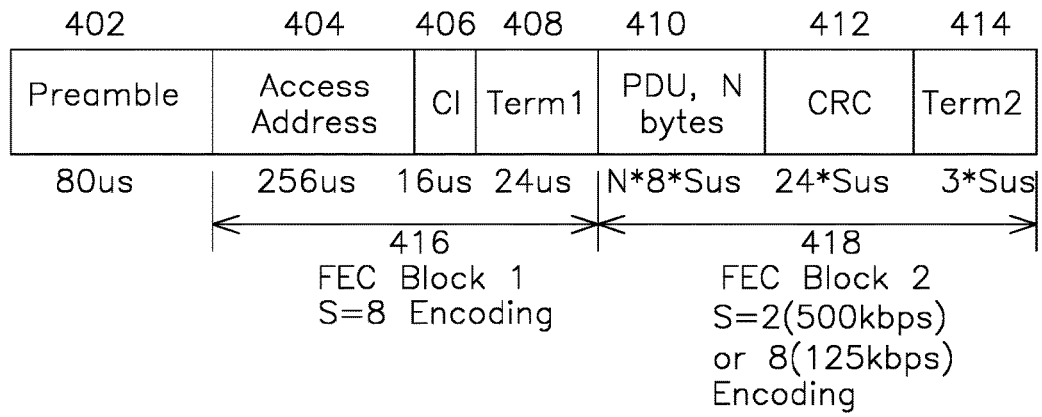
FIG. 4 shows a diagram of a BLR packet.

FIG. 4 shows the format and bit coding for a Bluetooth LE coded packet, as described in table 3.1 and FIGS. 3.5 and 3.6 of the Bluetooth specification. The preamble 402 is the well-known sequence used by the receiver for packet detection, followed by an access address 404 header 416 part and payload part 418 comprising packet data unit (PDU) 410, cyclic redundancy check (CRC) 412 and Term2 414. Each bit of the access address header 404 is coded using S=8 repetition coding for data rates of 500 kbps or 125 kbps. Each bit of the payload 418 is coded using S=8 repetition coding for 125 kbps, and using S=2 repetition coding for 500 kbps data rates. In one aspect of the invention, the bitstream modification 210 is operative over both the access header 404 and payload 418 for a first datarate such as 125 kbps, and in another aspect of the invention, the bitstream modification 210 is operative over only the access header 404 for a second datarate such as 500 kbps.

FIG. 3A shows an alternative method for transmit signal processing which removes the frequency spurs of FIG. 1A. Where the reference numbers are identical in different figures, the functional block is the same and can be operationally understood with respect to the previously described functional block with the same reference number. FIG. 3A includes many of the same functions described for FIG. 2A, however the repetition coding 308 is directly coupled to the GFSK modulator 310 which performs GFSK modulation based on the hop index 214 coupled to the frequency hop generator 216 as described in FIG. 2A. The output of the GFSK modulator 310 is applied to a waveform modification, which may be any function which results in a low frequency modulation of the GFSK modulator 310 output.

In one embodiment of the invention performed in the time domain, the form of the low frequency modulation GFSK output may take the form:

$$y(t)=x(t)x(t)*e^{-2\pi(w(mod(t,k)t))/Fs}$$

where:

x(t) is the unmodified GFSK signal output at baseband by 310 to be modified into y(t) and subsequently modulated to the 2.4 GHz channel of Bluetooth. In an embodiment where Low-IF (Intermediate Frequency) architecture is used, x(t) inherently will have a frequency shift of less than 5 MHz. In an embodiment where Low-IF architecture is used, x(t) is shifted by 2 MHz with respect to the Direct Current (DC).

w(.) is the general form of the modification function, which provides a low frequency dithering of x(t) which may be tracked by the receiver. The specific example in the equation w(mod(t,k)t) is a repeating function which reduces the GFSK spectral spurs, and may be a sinusoidal or triangle wave signal, which provides a varying frequency offset that a receiver can track without abrupt frequency changes.

k is a time duration length for a canonical waveform modification, which may be the length of an entire header and/or payload, or it may be a subsegment such as an exemplar ⅕ of the length of a header or payload, the mod(t,k) function being applied canonically 5 or more times to the payload, resulting in an output with a spreading of the spectral energy contained in the repetition coding of x(t);

t is a transmit frame length;

Fs is the sampling frequency of the input samples, such as 8 MHz.

Alternatively, the modification may be performed in the baseband sampled digital signal domain as a modification to the baseband signal as:

$$y(n)=x(n)*e^{2\pi(w(mod(n,n1)*n))/Fs}$$

where:

x(n) is the unmodified GFSK baseband signal output by 310 as a series of digital analytic (real and imaginary) samples to be modified into y(n). In an embodiment where Low-IF architecture is used, x(n) inherently will have a frequency shift of less than 5 MHz. In an embodiment where Low-IF architecture is used, x(n) is shifted by 2 MHz with respect to the DC.

w(.) is a digital modifying function which reduces the GFSK spectral spurs of repetition coding, and may be a comparatively slowly varying sine or triangle wave signal without abrupt frequency changes and preferably resulting in a low modulation index of the resultant Bluetooth spectrum;

mod(n,n1) is the particular modifying sequence of samples applied in a canonical fashion, such as the example above for 5 repetitions of 20 samples (with a restricted slope (such as a triangle wave or sine wave);

n is a transmit frame length;

Fs is the sampling frequency of the input samples, such as approximately 8 MHz.

In one example of the invention, w(.) is a function with 20 samples operating 5 or more times over approximately 100 samples. In another example of the invention, the sampling rate Fs is 8 MHz and the range of w is +/−10 kHz (resulting in the spreading of spurs 102 over 10 kHz, resulting in a spectrum closer to the one shown in FIG. 1B). In another example of the invention, w(.) causes a frequency deviation which is ⅕₀₀th or less of the greatest modulation frequency present in x(t). For example, where the data rate is 125 kbps and w(t) is sinusoidal, the carrier frequency may vary by an amount of approximately 30 kHz over a duration of approximately 500 symbols.

Figure 5:
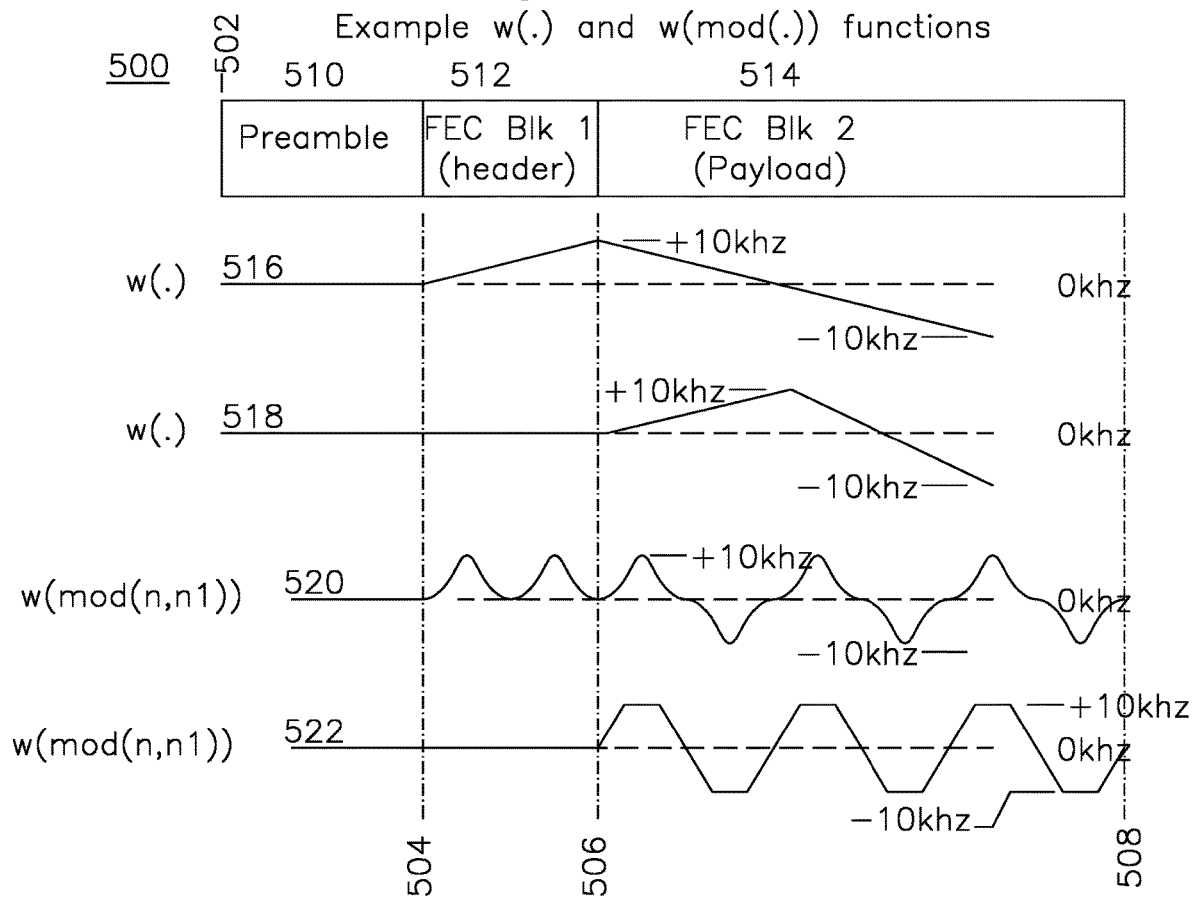
FIG. 5 shows a BLR packet with plots of example modification functions.

FIG. 5 shows example w(.) and w(mod(n,n1)) functions with respect to a Bluetooth packet 500, which includes a preamble from 502 to 504, header from 504 to 506, and payload from 506 to 508. The plots are shown as continuous real values for clarity, in practice they will typically be a stream of analytic (real+imaginary) values. The w(.) modifications which are plotted may be applied during the header and payload durations of plots 516 and 520, or alternatively may be done during the payload only of plots 518 and 522. In the present example, the w(.) function causes a shift in the unmodified Bluetooth frequencies of less than 10 kHz, although this is shown for illustration only and the shift caused by w(.) may be larger or smaller. The modified output will subsequently be applied to a mixer for up-conversion of the signal to 2.4 GHz and transmission to remote stations. The w(.) modification will result in the receiving station tracking the w(.) modification as a variation in frequency which is within the tracking range of the receiver, which is the motivation for limiting the frequency deviation to 10 kHz in these examples. Waveforms 516 shows a ramp w(.) example where the frequency shift is a fixed slope and non-canonical, waveform 518 shows a first slope and second slope during a payload only part of the Bluetooth packet. Waveform 520 shows an example of a different canonical modification applied twice during the header duration 504 to 506, and 6 times (with inversions) during the payload interval 506 to 508. Waveform 522 shows a bipolar canonical waveform applied three times with a brief pedestal. These modification waveforms are shown to provide examples of w(.) functions which are possible, and not to limit the scope of the invention.

The result of the low frequency modulation of the GFSK is that a prior art GFSK receiver is able to track the low frequency variation in GFSK symbols while receiving the frequency of each hop using existing receive signal frequency tracking techniques.

In another example of the invention, the receiver RF mixer (not shown) or intermediate frequency mixer (not shown) of baseband mixer of 224 has a w(t) modulation function applied which matches the one applied during transmit 312. In this manner, the transmit spectral spurs 102 can be reduced by spreading their spectral energy over surrounding bandwidth while providing for compensation at the receiver baseband mixer/processor 224 for accurate signal processing and demodulation of the Bluetooth signals.

We claim:

1. A bitstream modifier for modification of a Bluetooth baseband transmit data packet having a preamble part, a header part, and a payload part, the bitstream modifier configured to modify at least one of the header part or the payload part, where the header part or payload part is formed using repetition coding comprising transmission of a first fixed bit pattern for a '0' value and a second fixed bit pattern for a '1' value of the header part or payload part;

the bitstream modifier configured to increase the randomness of a repetition coding by multiplication of a sequence of header part or payload part with a bitstream modifier comprising a bit sequence, and where the bitstream modifier has an inverse function for restoration of the header part and payload part in a receiver receiving a bitstream modified header part or payload part;

the modified Bluetooth baseband transmit data packet header part and payload part thereby having reduced spectral peaks and where the bit sequence comprises a pseudorandom sequence of binary values, each binary value comprising one of two different binary values;

the pseudorandom sequence selected to reduce a periodicity length of the repetition coding.

2. The bitstream modifier of claim 1 where the repetition coding substitutes a fixed pattern for each header or payload bit when the data packet is configured for a data rate of 125 kbps or a data rate of 500 kbps.

3. The bitstream modifier of claim 1 where the pseudorandom sequence of binary values reduces or eliminates spectral spurs which are present in a Bluetooth baseband data packet which uses repetition coding compared to spectral spurs of a Bluetooth baseband transmit data packet which does not use of the bitstream modifier.

4. The bitstream modifier of claim 2 where the fixed bit pattern is [0011] for a '0' bit and the second fixed bit pattern is [1100] for a '1' bit.

5. The bitstream modifier of claim 3 where the first fixed bit pattern is [0011] for a '0' bit and the second fixed bit pattern is [1100] for a '1' bit.

6. The bitstream modifier of claim 1 where the Bluetooth packet is operative in a Bluetooth low energy (LE) protocol, and the data packet is configured for a data rate of either 500 kbps or 125 kbps.

7. The bitstream modifier of claim 1 where at least one of the header or the payload is formed by an exclusive or (XOR) operation with a pseudo random bitstream (PRBS).

8. The bitstream modifier of claim 1 where the bitstream modifier is an exclusive or with values formed by a prime polynomial.

9. The bitstream modifier of claim 8 where the prime polynomial is at least one of:

$$x^2+x+1,$$

$$x^3+x^2+1,$$

$$x^4+x^3+1, \text{ or}$$

$$x^5+x^3+1.$$

10. A Bluetooth transmitter configured to generate a modified baseband Bluetooth transmit packet from an original baseband Bluetooth transmit packet comprising a preamble part, header part, and payload part, the original baseband Bluetooth transmit packet having a time domain form $x(t)$, the modified transmit packet being $x(t)*e^{-2\pi(w(mod(t,k)t))/Fs}$ where mod(t,k) is a modification function applied to the header part and the payload part, and mod(t,k) is selected to reduce a spectral peak in the modified transmit packet caused by repetition coding in the header part and payload part compared to using a mod(t,k) with value unity;

where mod(t,k) reducing the spectral peak is a continuous function resulting in a frequency change of less than 10 Khz and without causing abrupt frequency changes in the modified baseband Bluetooth transmit packet; and Fs is approximately 8 Mhz.

11. The Bluetooth transmitter of claim 10 where mod(t,k) is a sinusoidal function or a sawtooth function.

12. The Bluetooth transmitter of claim 10 where mod(t,k) has a maximum variation of approximately 30 kHz over a duration of approximately 500 symbols.

13. The Bluetooth transmitter of claim 10 where mod(t,k)=1 when the data rate is neither 125 kbps nor 500 kbps.

14. The Bluetooth transmitter of claim 10 where the Bluetooth packet type is Low Energy and the data rate is either 125 kbps or 500 kbps.

15. A Bluetooth transmitter operative on a Bluetooth packet having a preamble part, a header part, and a payload part forming a stream of baseband Bluetooth symbols, the stream of baseband Bluetooth symbols comprising repetition coding whereby each binary value of the header part and payload part is replaced by a first plurality of binary values for a 'one' value, and a second plurality of binary values for a 'zero' value, thereby forming an original baseband Bluetooth packet, the Bluetooth transmitter operative to mix the symbols of the original baseband Bluetooth packet to a modulation frequency fc(t) to form a modulated Bluetooth packet, where fc(t) is Fc*mod(t,k), and mod(t,k) is a function which has a variation of approximately 30 kHz in a duration of approximately 500 symbols;

mod(t,k) applied exclusively during the header part and the payload part of the baseband Bluetooth packet whereby mod(t,k) reduces frequency spurs of the modulated Bluetooth packet compared to mod(t,k) having a variation of zero.

16. The Bluetooth transmitter of claim 15 where mod(t,k) is a sinusoidal function.

17. The Bluetooth transmitter of claim 15 where mod(t,k) is a triangular function.

18. The Bluetooth transmitter of claim 15 where mod(t,k) has a cycle time of less than the duration of a Bluetooth packet.

19. The Bluetooth transmitter of claim 15 where mod(t,k)=1 if the data rate is not 500 kbps or 125 kbps.

* * * * *